United States Patent
Lin et al.

(10) Patent No.: US 12,388,568 B2
(45) Date of Patent: Aug. 12, 2025

(54) METHOD AND APPARATUS FOR RANDOM ACCESS

(71) Applicant: Telefonaktiebolaget LM Ericsson (publ), Stockholm (SE)

(72) Inventors: Zhipeng Lin, Nanjing (CN); Andres Reial, Lomma (SE); Robert Mark Harrison, Grapevine, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 654 days.

(21) Appl. No.: 17/623,652

(22) PCT Filed: Jun. 30, 2020

(86) PCT No.: PCT/CN2020/099386
§ 371 (c)(1),
(2) Date: Dec. 29, 2021

(87) PCT Pub. No.: WO2021/004336
PCT Pub. Date: Jan. 14, 2021

(65) Prior Publication Data
US 2022/0321263 A1    Oct. 6, 2022

(30) Foreign Application Priority Data
Jul. 5, 2019  (WO) ................ PCT/CN2019/094917

(51) Int. Cl.
*H04L 1/08*   (2006.01)
*H04L 5/00*   (2006.01)
*H04W 74/0833*   (2024.01)

(52) U.S. Cl.
CPC .............. *H04L 1/08* (2013.01); *H04L 5/0094* (2013.01); *H04W 74/0833* (2013.01)

(58) Field of Classification Search
None
See application file for complete search history.

(56) References Cited

U.S. PATENT DOCUMENTS

2015/0289292 A1   10/2015  Sun et al.
2016/0309518 A1*  10/2016  Patel ................ H04W 74/0833
(Continued)

FOREIGN PATENT DOCUMENTS

CN    109845378 A    6/2019
WO    2018064367 A1  4/2018

OTHER PUBLICATIONS

Office Action for Canadian Patent Application No. 3143867, mailed Jan. 16, 2023, 4 pages.
(Continued)

*Primary Examiner* — Christine T Duong
(74) *Attorney, Agent, or Firm* — Withrow & Terranova, PLLC

(57) ABSTRACT

Various embodiments of the present disclosure provide a method for random access. The method which may be performed by a terminal device comprises performing a first transmission of a message from the terminal device to a network node in a random access procedure, according to first configuration information. The first transmission of the message comprises a transmission of a first preamble and a transmission of a payload on a shared channel. The method further comprises performing a second transmission of the message from the terminal device to the network node in the random access procedure, according to second configuration information. The second transmission of the message comprises at least one of: a transmission of a second preamble and a retransmission of the payload on the shared channel.

18 Claims, 13 Drawing Sheets

(56) References Cited

U.S. PATENT DOCUMENTS

| | | |
|---|---|---|
| 2018/0110074 A1 | 4/2018 | Akkarakaran et al. |
| 2019/0215220 A1* | 7/2019 | Islam ................ H04W 74/0833 |
| 2020/0022188 A1* | 1/2020 | Lee ........................... H04L 5/00 |

OTHER PUBLICATIONS

First Office Action for Chinese Patent Application No. 202080048513.3, mailed Apr. 14, 2023, 8 pages.

CAICT, "R1-1905126: Considerations on Procedure for Two-step RACH," 3GPP TSG RAN WG1 Meeting #96bis, Apr. 8-12, 2019, Xi'an, China, 9 pages.

Extended European Search Report for European Patent Application No. 20836677.3, mailed Jul. 4, 2022, 9 pages.

Interdigital Communications, "R1-1700703: 2-step random access procedure," 3GPP TSG RAN WG1 AH_NR Meeting, Jan. 16-20, 2017, Spokane, Washington, 4 pages.

Qualcomm Incorporated, "R1-1903321: Procedures for Two-Step RACH," 3GPP TSG-RAN WG1 Meeting #96, Feb. 25-Mar. 1, 2019, Athens, Greece, 9 pages.

Qualcomm Incorporated, "R1-1907256: Procedures for Two-Step RACH," 3GPP TSG-RAN WG1 Meeting #97, May 13-17, 2019, Reno, Nevada, 13 pages.

ZTE Corporation, et al., "RP-182894: New work item: 2-step RACH for NR," 3GPP TSG RAN Meeting #82, Dec. 10-13, 2018, Sorrento, Italy, 5 pages.

International Search Report and Written Opinion for International Patent Application No. PCT/CN2020/099386, mailed Sep. 30, 2020, 9 pages.

International Preliminary Report on Patentability for International Patent Application No. PCT/CN2020/099386, mailed Nov. 4, 2021, 28 pages.

* cited by examiner

METHOD AND APPARATUS FOR RANDOM ACCESS

This application is a 35 U.S.C. § 371 national phase filing of International Application No. PCT/CN2020/099386, filed Jun. 30, 2020, which claims the benefit of International Application No. PCT/CN2019/094917, filed Jul. 5, 2019, the disclosures of which are incorporated herein by reference in their entireties.

FIELD OF THE INVENTION

The present disclosure generally relates to communication networks, and more specifically, to a method and apparatus for random access.

BACKGROUND

This section introduces aspects that may facilitate a better understanding of the disclosure. Accordingly, the statements of this section are to be read in this light and are not to be understood as admissions about what is in the prior art or what is not in the prior art.

Communication service providers and network operators have been continually facing challenges to deliver value and convenience to consumers by, for example, providing compelling network services and performance. With the rapid development of networking and communication technologies, wireless communication networks such as long-term evolution (LTE) and new radio (NR) networks are expected to achieve high traffic capacity and end-user data rate with lower latency. In order to connect to a network node, a random access (RA) procedure may be initiated for a terminal device. In the RA procedure, system information (SI) and synchronization signals (SS) as well as the related radio resource and transmission configuration can be informed to the terminal device by control information from the network node. The RA procedure can enable the terminal device to establish a session for a specific service with the network node.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

A wireless communication network such as a 5G/NR network may be able to support flexible network configuration. Various signaling approaches (e.g., a four-step approach, a two-step approach, etc.) may be used for a RA procedure of a terminal device to set up a connection with a network node. In a two-step RA procedure, the terminal device can transmit a RA preamble together with the physical uplink shared channel (PUSCH) in a message (which is also known as message A or msgA for short) to the network node, and receive a response message (which is also known as message B or msgB for short) from the network node. The msgA PUSCH can be transmitted in a PUSCH occasion (PO) configured with one or more resource units (RUs), and the RA preamble can be transmitted in a time-frequency physical random access channel (PRACH) occasion (which is also known as a RA occasion or RO for short). In the case that the network node does not receive the initial transmission of msgA completely, the terminal device may perform one or more retransmissions of msgA to retry session establishment with the network node. An effective design of resource allocation for different retransmissions of msgA may potentially improve RA performance for the terminal device. Therefore, it may be desirable to configure different transmissions of msgA in a RA procedure more flexibly and efficiently.

Various embodiments of the present disclosure propose a solution for RA, which can support adaptive transmission configuration for a RA procedure such as a two-step RA procedure, for example, by enabling resources available for different transmissions of msgA to vary according to a specific pattern, so as to increase diversity of transmission configurations and improve performance of the RA procedure.

It can be realized that the terms "PRACH occasion", "random access channel (RACH) occasion" or "RA occasion" mentioned herein refers to a time-frequency resource usable for the preamble transmission in a RA procedure, which may also be referred to as "random access occasion (RO)". These terms may be used interchangeably in this document.

Similarly, it can be realized that the terms "PUSCH occasion", "uplink shared channel occasion" or "shared channel occasion" mentioned herein refers to a time-frequency resource usable for PUSCH transmission in a RA procedure, which may also be referred to as "physical uplink shared channel occasion (PO)". These terms may be used interchangeably in this document.

According to a first aspect of the present disclosure, there is provided a method performed by a terminal device such as a user equipment (UE). The method may comprise performing a first transmission of a message from the terminal device to a network node in a RA procedure, according to first configuration information. The first transmission of the message may comprise a transmission of a first preamble and a transmission of a payload on a shared channel. The method may further comprise performing a second transmission of the message from the terminal device to the network node in the RA procedure, according to second configuration information. The second transmission of the message may comprise at least one of: a transmission of a second preamble and a retransmission of the payload on the shared channel.

According to a second aspect of the present disclosure, there is provided an apparatus which may be implemented as a terminal device. The apparatus comprises one or more processors and one or more memories comprising computer program codes. The one or more memories and the computer program codes are configured to, with the one or more processors, cause the apparatus at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus which may be implemented as a terminal device. The apparatus may comprise a first transmitting unit and a second transmitting unit. In accordance with some exemplary embodiments, the first transmitting unit is operable to carry out at least the step of performing the first transmission of the message in the method according to the first aspect of the present disclosure. The second transmitting unit is operable to carry out at least the step of performing the second transmission of the message in the method according to the first aspect of the present disclosure.

According to a fifth aspect of the present disclosure, there is provided a method performed by a network node such as a base station. The method may comprise receiving a first transmission of a message from a terminal device to the network node in a RA procedure, according to first configuration information. The first transmission of the message may comprise a transmission of a first preamble and a transmission of a payload on a shared channel. The method may further comprise receiving a second transmission of the message from the terminal device to the network node in the RA procedure, according to second configuration information. The second transmission of the message may comprise at least one of: a transmission of a second preamble and a retransmission of the payload on the shared channel.

According to a sixth aspect of the present disclosure, there is provided an apparatus which may be implemented as a network node. The apparatus comprises one or more processors and one or more memories comprising computer program codes. The one or more memories and the computer program codes are configured to, with the one or more processors, cause the apparatus at least to perform any step of the method according to the fifth aspect of the present disclosure.

According to a seventh aspect of the present disclosure, there is provided a computer-readable medium having computer program codes embodied thereon which, when executed on a computer, cause the computer to perform any step of the method according to the fifth aspect of the present disclosure.

According to an eighth aspect of the present disclosure, there is provided an apparatus which may be implemented as a network node. The apparatus may comprise a first receiving unit and a second receiving unit. In accordance with some exemplary embodiments, the first receiving unit is operable to carry out at least the step of receiving the first transmission of the message in the method according to the fifth aspect of the present disclosure. The second receiving unit is operable to carry out at least the step of receiving the second transmission of the message in the method according to the fifth aspect of the present disclosure.

In accordance with an exemplary embodiment, the first configuration information and the second configuration information may indicate resources for the first transmission and the second transmission of the message, respectively.

In accordance with an exemplary embodiment, the second configuration information may have one or more parameters associated with the first configuration information. Optionally, the second configuration information may be set as the same as the first configuration information.

In accordance with an exemplary embodiment, the second configuration information may have one or more parameters different from the first configuration information.

In accordance with an exemplary embodiment, the one or more parameters may indicate but not limited to at least one of:
  a preamble identifier (ID);
  a RA channel time-frequency resource;
  a shared channel time-frequency resource;
  a demodulation reference signal (DMRS) identifier;
  a redundancy version (RV);
  a modulation and coding scheme (MCS); and
  transmission power.

In accordance with an exemplary embodiment, the first configuration information and the second configuration information can be determined according to a specific pattern.

In accordance with an exemplary embodiment, the specific pattern may be based at least in part on a predetermined RV pattern.

In accordance with an exemplary embodiment, the specific pattern may be provisioned or configured by the network node.

In accordance with an exemplary embodiment, the second configuration information may be based at least in part on the first configuration information.

In accordance with an exemplary embodiment, the second configuration information can enable the network node to combine different transmissions of the message.

In accordance with an exemplary embodiment, the first configuration information can enable the network node to determine that the first transmission of the message is an initial transmission of the message, and the second configuration information can enable the network node to determine that the second transmission of the message is a retransmission of the message.

In accordance with an exemplary embodiment, the first preamble and the second preamble can be determined according to a predetermined sequence.

In accordance with an exemplary embodiment, the first preamble and the second preamble may be the same or different.

In accordance with an exemplary embodiment, the second configuration information may be indicated at least partly by a response message transmitted from the network node to the terminal device.

In accordance with an exemplary embodiment, the resource indicated by the first configuration information and the corresponding resource indicated by the second configuration information may have a correlation satisfying a correlation criterion.

In accordance with an exemplary embodiment, the resources indicated by the first and second configuration information for the terminal device and the corresponding resources indicated by configuration information for other terminal devices may have a correlation satisfying another correlation criterion.

In accordance with an exemplary embodiment, the resource indicated by the second configuration information may comprise resource reserved for a retransmission of the message.

In accordance with an exemplary embodiment, the resource indicated by the second configuration information may comprise resource randomly selected for a retransmission of the message.

In accordance with an exemplary embodiment, the message may be message A (or msgA for short) in a two-step RA procedure.

In accordance with an exemplary embodiment, the first preamble may be a first PRACH preamble, and the second preamble may be a second PRACH preamble.

In accordance with an exemplary embodiment, the shared channel may be a PUSCH.

According to a ninth aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station which may perform any step of the method according to the fifth aspect of the present disclosure.

According to a tenth aspect of the present disclosure, there is provided a communication system including a host computer. The host computer may comprise processing circuitry configured to provide user data, and a communication interface configured to forward the user data to a cellular network for transmission to a UE. The cellular network may comprise a base station having a radio interface and processing circuitry. The base station's processing circuitry may be configured to perform any step of the method according to the fifth aspect of the present disclosure.

According to an eleventh aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station. The UE may perform any step of the method according to the first aspect of the present disclosure.

According to a twelfth aspect of the present disclosure, there is provided a communication system including a host computer. The host computer may comprise processing circuitry configured to provide user data, and a communication interface configured to forward user data to a cellular network for transmission to a UE. The UE may comprise a radio interface and processing circuitry. The UE's processing circuitry may be configured to perform any step of the method according to the first aspect of the present disclosure.

According to a thirteenth aspect of the present disclosure, there is provided a method implemented in a communication system which may include a host computer, a base station and a UE. The method may comprise, at the host computer, receiving user data transmitted to the base station from the UE which may perform any step of the method according to the first aspect of the present disclosure.

According to a fourteenth aspect of the present disclosure, there is provided a communication system including a host computer. The host computer may comprise a communication interface configured to receive user data originating from a transmission from a UE to a base station. The UE may comprise a radio interface and processing circuitry. The UE's processing circuitry may be configured to perform any step of the method according to the first aspect of the present disclosure.

According to a fifteenth aspect of the present disclosure, there is provided a method implemented in a communication system which may include a host computer, a base station and a UE. The method may comprise, at the host computer, receiving, from the base station, user data originating from a transmission which the base station has received from the UE. The base station may perform any step of the method according to the fifth aspect of the present disclosure.

According to a sixteenth aspect of the present disclosure, there is provided a communication system which may include a host computer. The host computer may comprise a communication interface configured to receive user data originating from a transmission from a UE to a base station. The base station may comprise a radio interface and processing circuitry. The base station's processing circuitry may be configured to perform any step of the method according to the fifth aspect of the present disclosure.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1A:
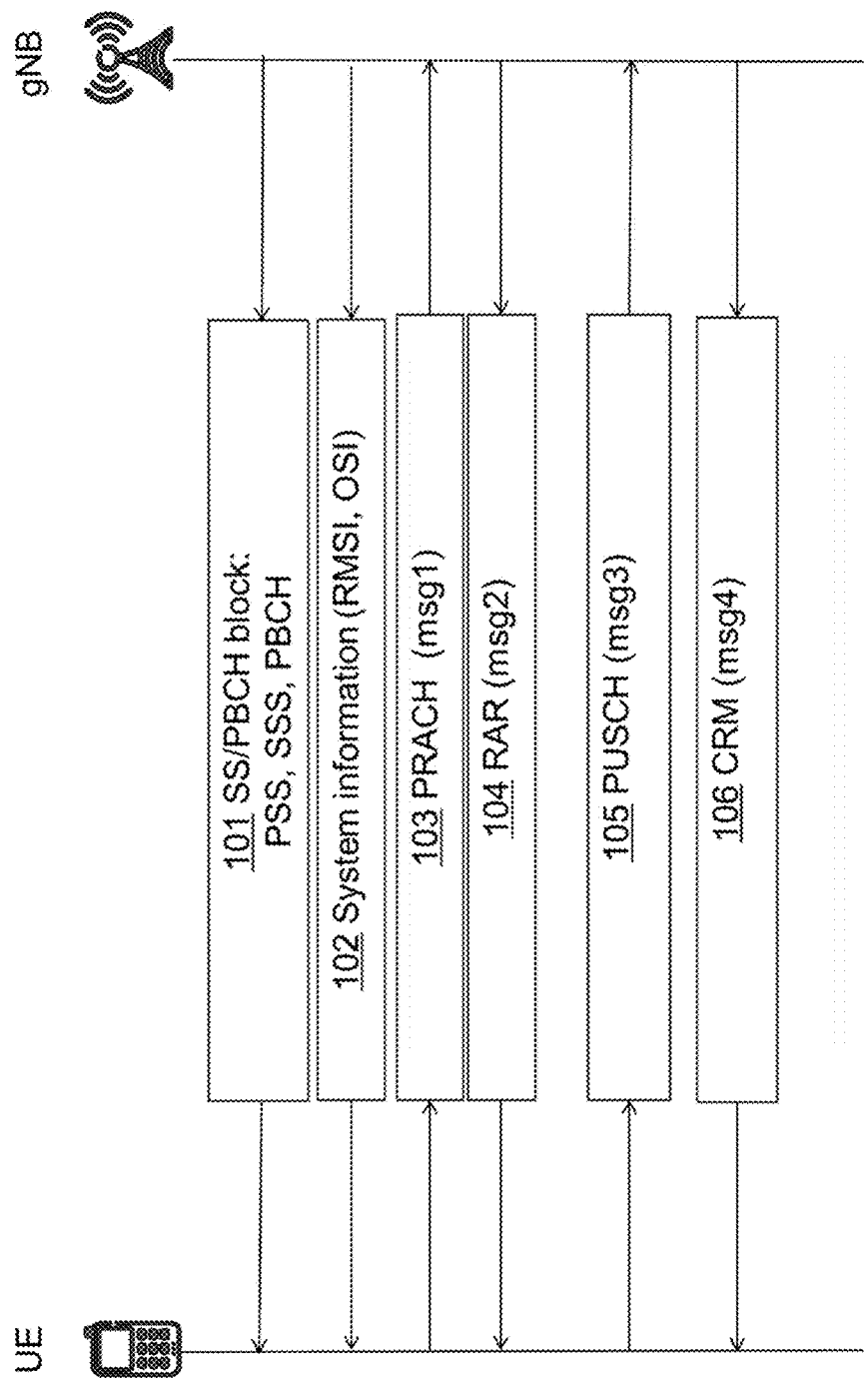
FIG. 1A is a diagram illustrating an exemplary four-step RA procedure according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" refers to a network device in a communication network via which a terminal device accesses to the network and receives services therefrom. The network node may refer to a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a mobile terminal, a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Wireless communication networks are widely deployed to provide various telecommunication services such as voice, video, data, messaging and broadcasts. As described previously, in order to connect to a network node such as a gNB in a wireless communication network, a terminal device such as a UE may need to perform a RA procedure to exchange essential information and messages for communication link establishment with the network node.

FIG. 1A is a diagram illustrating an exemplary four-step RA procedure according to an embodiment of the present disclosure. As shown in FIG. 1A, a UE can detect a synchronization signal (SS) by receiving 101 a synchronization signal and physical broadcast channel block (which is also known as a SS/PBCH block or SSB for short) from a gNB, for example, including a primary synchronization signal (PSS), a secondary synchronization signal (SSS), and a physical broadcast channel (PBCH). The UE can decode 102 some system information (e.g., remaining minimum system information (RMSI) and other system information (OSI)) broadcasted in the downlink (DL). Then the UE can transmit 103 a PRACH preamble (message1/msg1) in the uplink (UL). The gNB can reply 104 with a random access response (RAR, message2/msg2). FIG. 1C schematically shows the exemplary content of a RAR with 7 octets. As shown in FIG. 1C, the RAR transmitted by the gNB may have some fields or bits (which are represented by R, Timing Advance Command, UL Grant, Temporary C-RNTI (cell-radio network temporary identifier) in FIG. 1C) to indicate UL scheduling configuration of the UE.

In response to the RAR from the gNB, the UE can transmit 105 the UE's identification information (message3/msg3) on PUSCH. Then the gNB can send 106 a contention resolution message (CRM, message4/msg4) to the UE. In some cases, the PRACH preamble (message1/msg1) may be reattempted by the UE and different preambles can be selected for the initial transmission and its subsequent retransmission(s). Parameters such as PREAMBLE_TRANSMISSION_COUNTER and PREAMBLE_POW- ER_RAMPING_COUNTER can be maintained on UE side for different transmissions of the preambles.

In the exemplary procedure shown in FIG. 1A, the UE can transmit message3/msg3 on PUSCH after receiving a timing advance command in the RAR, allowing message3/msg3 on PUSCH to be received with timing accuracy within a cyclic prefix (CP). Without this timing advance, a very large CP may be needed in order to be able to demodulate and detect message3/msg3 on PUSCH, unless the communication system is applied in a cell with very small distance between the UE and the gNB. Since a NR system can also support larger cells with a need for providing a timing advance command to the UE, the four-step approach is needed for the RA procedure.

Figure 1B:
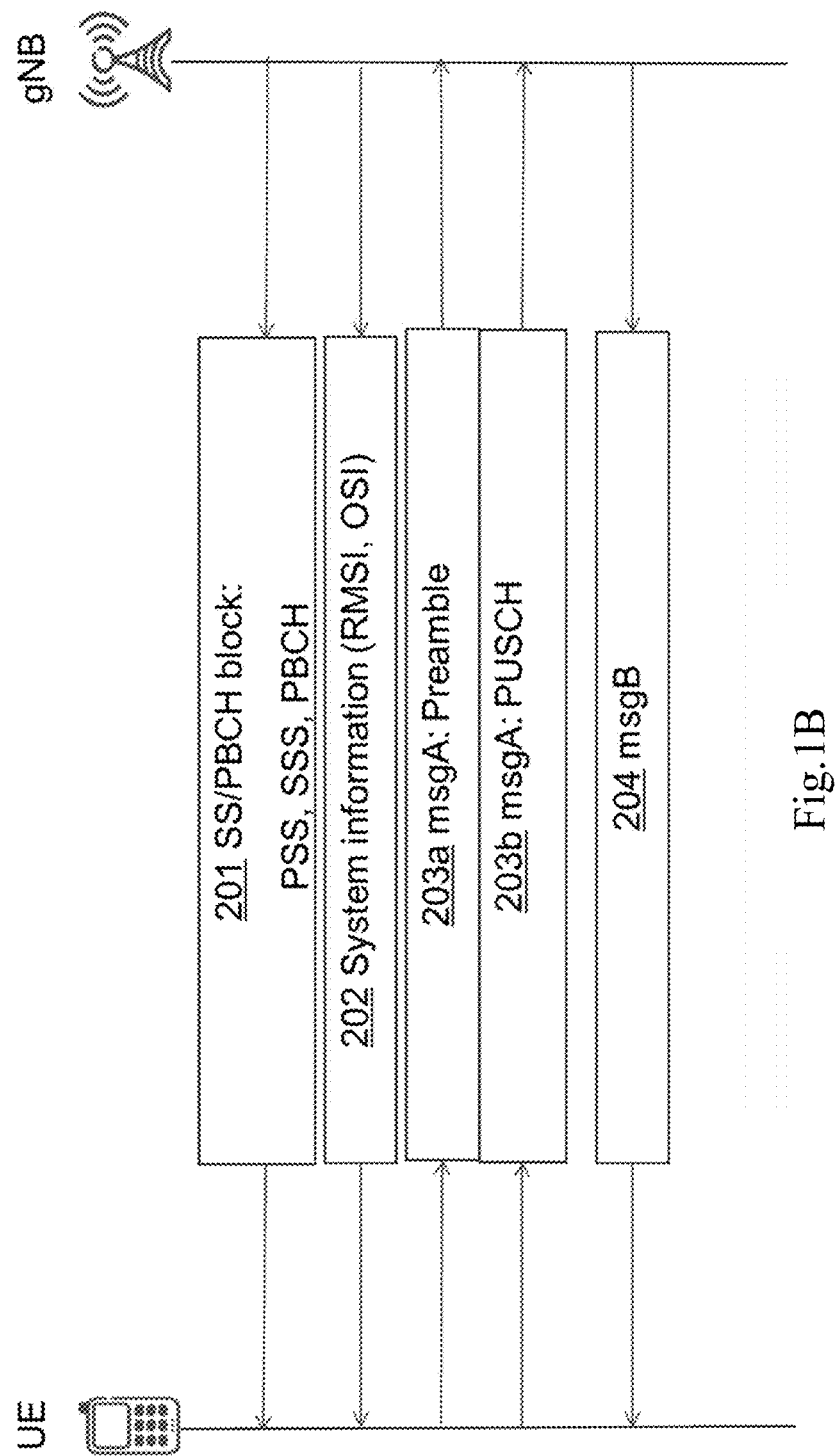
FIG. 1B is a diagram illustrating an exemplary two-step RA procedure according to an embodiment of the present disclosure.
Figure 1C:
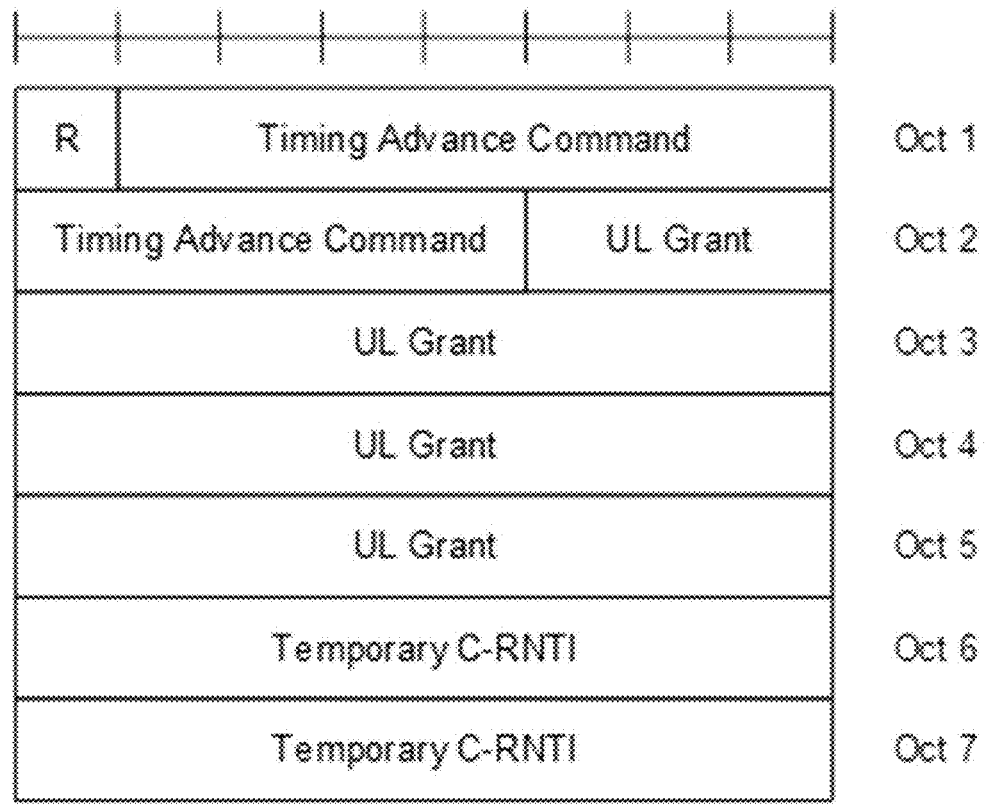
FIG. 1C schematically shows the exemplary content of a RAR with 7 octets according to an embodiment of the present disclosure.

FIG. 1B is a diagram illustrating an exemplary two-step RA procedure according to an embodiment of the present disclosure. Similar to the procedure as shown in FIG. 1A, in the procedure shown in FIG. 1B, a UE can detect a SS by receiving 201 an SS/PBCH block (e.g., comprising PSS, SSS and PBCH) from a gNB, and decode 202 system information (e.g., comprising RMSI and OSI) broadcasted in the DL. Compared to the four-step RA procedure as shown in FIG. 1A, the UE performing the procedure in FIG. 2 can complete random access in only two steps. Firstly, the UE sends 203a/203b to the gNB a message A (msgA) including RA preamble together with higher layer data such as a radio resource control (RRC) connection request possibly with some small payload on PUSCH. Secondly, the gNB sends 204 to the UE a RAR (also called message B or msgB) including UE identifier assignment, timing advance information, a contention resolution message, and etc.

In the two-step RA procedure, the msgA preamble and msgA PUSCH (also called msgA payload) can be transmitted by the UE in one message called message A. The msgA preamble may be transmitted in time-frequency resource locations referred to as PRACH occasions, and the msgA PUSCH may be transmitted in time-frequency resource locations referred to as PUSCH occasions. The number of preambles (e.g., one or multiple preambles) mapped to one PUSCH resource unit (RU) may be configurable. The PUSCH RU for two-step RA can be defined as the PUSCH occasion and at least one of demodulation reference signal (DMRS) port and DMRS sequence usable for the msgA payload transmission. The PUSCH RU may occupy a contiguous set of subcarriers and symbols.

Figures 2A, 2B:
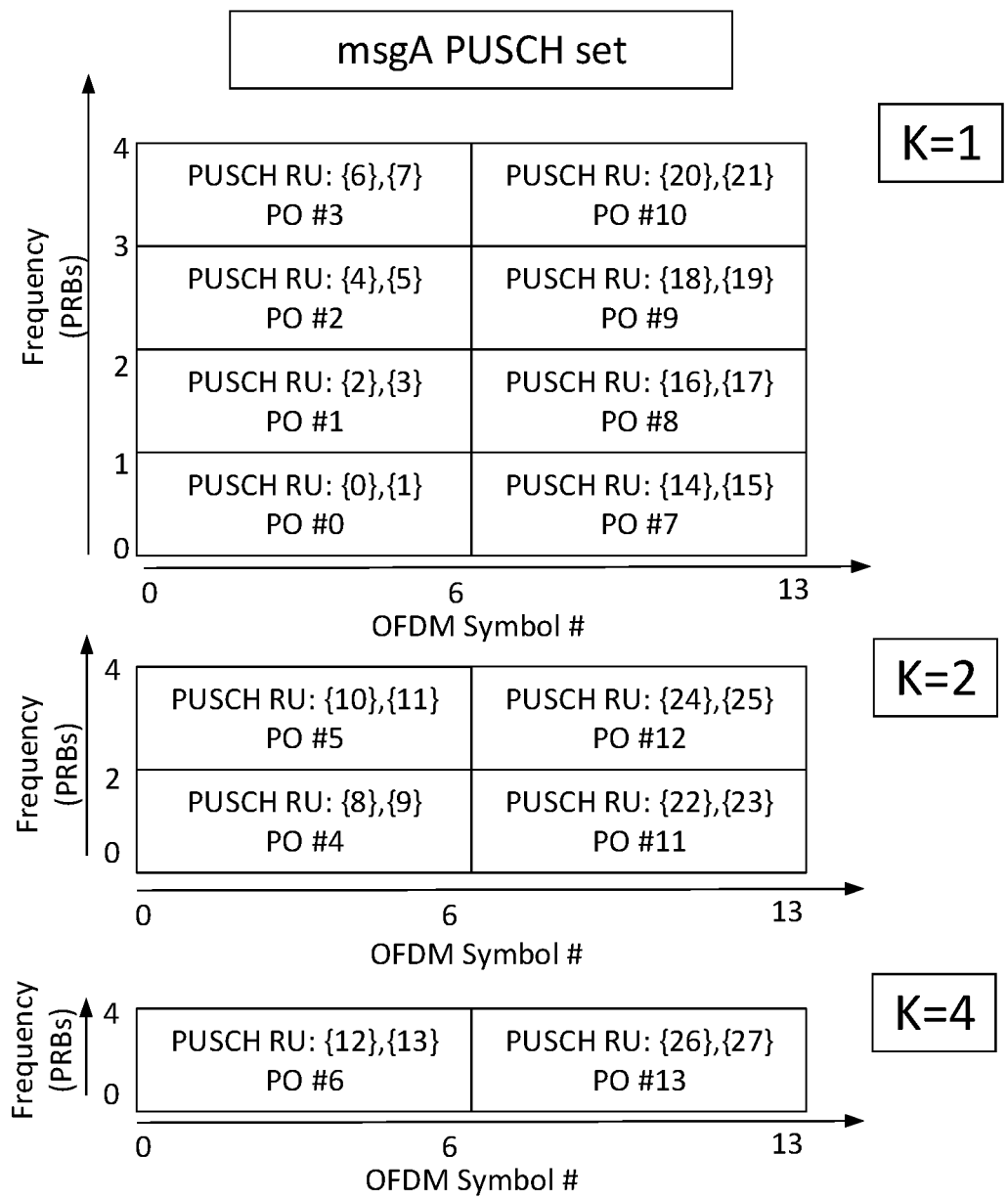
FIG. 2A is a diagram illustrating an exemplary PUSCH occasion according to some embodiments of the present disclosure.
FIG. 2B is a diagram illustrating an exemplary msgA PUSCH set according to some embodiments of the present disclosure.

FIG. 2A is a diagram illustrating an exemplary PUSCH occasion according to some embodiments of the present disclosure. As shown in FIG. 2A, there may be two PUSCH RUs in a PUSCH occasion, each PUSCH RU corresponding to a DMRS port and/or a DMRS sequence, which are indicated by $\{DMRS_{k,0}\}$ and $\{DMRS_{k,1}\}$. The PUSCH RUs corresponding to a PUSCH occasion may have 'K' physical radio block(s). The parameter K can vary (which will be described hereafter in connection with FIG. 2B), and a given physical radio block (PRB) may correspond to the PUSCH RUs with different sizes. Considering an association between a preamble and a PUSCH RU, the parameter K can be identified by which preamble is used. Optionally, there may be a guard band (in PRBs) or guard time for a PUSCH occasion. A set of resources containing multiple PUSCH occasions can be defined as a msgA PUSCH set.

FIG. 2B is a diagram illustrating an exemplary msgA PUSCH set according to some embodiments of the present disclosure. As shown in FIG. 2B, the msgA PUSCH set may comprise a set of PUSCH RUs and correspondingly contain multiple PUSCH occasions (POs) contiguous in frequency and in time (including guard band or period if defined). Optionally, frequency hopping may be supported by configuration of the msgA PUSCH set. According to an exemplary embodiment, the msgA PUSCH set may occur periodically and have a known length in symbols and position in frequency. Multi-user multiple-input multiple-output (MU-MIMO) reception can be supported in some implementations.

In the exemplary msgA PUSCH set, the POs may have different sizes, for example, corresponding to K=1, K=2 and K=4. As shown in FIG. 2B, for the case of K=1, each PO occupies 1 PRB in frequency and 6 orthogonal frequency division multiplexing (OFDM) symbols. Similarly, for the case of K=2, each PO occupies 2 PRBs in frequency and 6 OFDM symbols, while for the case of K=4, each PO occupies 4 PRBs in frequency and 6 OFDM symbols.

As an exemplary and non-limiting embodiment, the msgA PUSCH set shown in FIG. 2B comprises fourteen POs, which are represented by PO #0 through PO #13. Each PO contains two PUSCH RUs, for example, PUSCH RUs {6} and {7} in PO #3, PUSCH RUs {10} and {11} in PO #5, PUSCH RUs {12} and {13} in PO #6, etc. A PUSCH RU may be associated with a distinct DMRS transmission. The distinct DMRS transmission can be a DMRS antenna port, a DMRS with a different sequence initialization (or equivalently a different DMRS scrambling identifier (ID)), or a combination of a DMRS antenna port and a DMRS sequence initialization. As an example, if a PRB corresponds the PUSCH RUs with size K, the DMRS (or PUSCH RU) index or identifier may be a function of this size. According to an exemplary embodiment, the total number of DMRS (or PUSCH RUs) can be calculated as the product of the number of POs and the number of PUSCH RUs per PO. Optionally, a UE can randomly select a PUSCH RU with index 'n' out of the configured msgA PUSCH set to perform a RA procedure.

It can be appreciated that the configuration for PUSCH occasion and the PUSCH RUs as shown in FIG. 2A or FIG. 2B is just as an example, and other suitable configuration (e.g., different values of K, and/or more or less PUSCH RUs in one PUSCH occasion) can also be implemented according to a proper criterion.

In accordance with some exemplary embodiments, a retransmission of msgA may be performed by a UE, for example, in response that an initial transmission of msgA is not received successfully and completely by a gNB. The retransmission of msgA may comprise a retransmission of:
  msgA preamble only (e.g. if no response message is received by the UE from the gNB);
  both msgA preamble and msgA PUSCH (e.g. if no response message is received by the UE from the gNB);
  msgA PUSCH only (e.g. if the preamble is detected by the gNB and a response message is transmitted by the gNB and received by the UE).

In accordance with some exemplary embodiments, the retransmission of msgA can be supported by a retransmission of msgA PRACH (e.g., with a re-selection of preamble) and/or msgA PUSCH. There may be some options for the msgA retransmission, for example, using the same or different payload for msgA PUSCH. Under certain conditions, a UE can perform msgA retransmission, for example, by retrying it on two-step RACH.

In order to perform a msgA retransmission in two-step RA, it may be needed to determine the resources used for the msgA retransmission. Various exemplary embodiments of the present disclosure propose a solution for RA, which can enable transmission configuration related to resource allocation (e.g., selection of preamble, PO, RV, etc.) to be provisioned for the initial transmission of msgA and potential retransmission(s) thereof, so that different transmissions of msgA in a RA procedure can be performed with enhanced resource utilization and improved transmission efficiency and flexibility.

In accordance with some exemplary embodiments, the resources configurable or available for different transmissions of msgA may comprise but not limited to the following:

msgA preamble including a preamble ID, a RACH occasion;
msgA PUSCH time/frequency resource;
msgA PUSCH DMRS sequence;
msgA PUSCH DMRS port;
msgA PUSCH redundancy version (RV) pattern;
msgA PUSCH modulation and coding scheme (MCS); and/or
msgA transmission power.

In accordance with some exemplary embodiments, the resource for the msgA retransmission may be at least partly the same as that used for the initial msgA transmission. Alternatively or additionally, the resource for the msgA retransmission can be determined according to a known pattern for different preamble ID/PO selection. Optionally, the resource for the msgA retransmission may be indicated in a response message to the msgA.

In the proposed solution according to some exemplary embodiments, the determination of the resources to be used by msgA (including the preamble part and the PUSCH part) between different transmissions may depend on whether a dynamic grant for msgA PUSCH (and even the preamble part) or a reserved msgA PUSCH resource is to be used. Unlike the msg1 retransmissions that are one-shot in nature, the msgA resources (at least msgA PUSCH resources) used in the retransmissions for a UE may need to be known by a gNB, for example, in order to perform soft combining between different msgA transmissions.

It is noted that some embodiments of the present disclosure are mainly described in relation to 5G or NR specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies may equally be utilized as long as exemplary embodiments described herein are applicable.

Figures 3A, 3B:
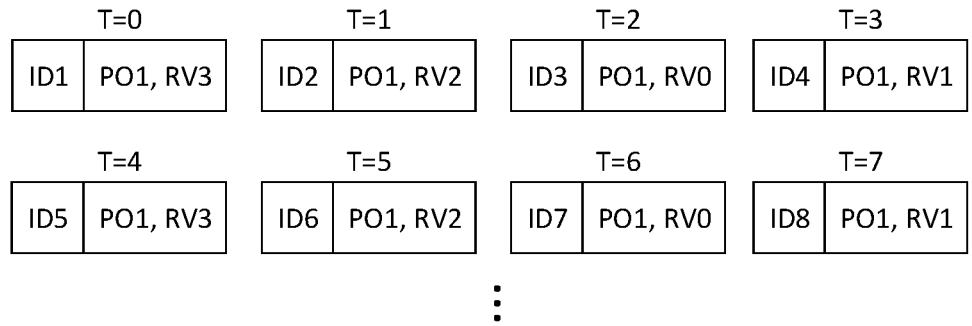
FIG. 3A is a diagram illustrating an exemplary msgA transmission pattern according to some embodiments of the present disclosure.
FIG. 3B is a diagram illustrating another exemplary msgA transmission pattern according to some embodiments of the present disclosure.

FIG. 3A is a diagram illustrating an exemplary msgA transmission pattern according to some embodiments of the present disclosure. In accordance with some exemplary embodiments, at least part of the resources (e.g., preamble ID, PUSCH resource, RV patterns for PUSCH, etc.) for the retransmissions of msgA may be the same as those used for the initial transmission of msgA. According to the exemplary msgA transmission pattern shown in FIG. 3A, POs are the same between the initial transmission (e.g., T=0) and the following retransmissions (e.g., T=1, T=2 and T=3), while the preamble IDs and RV patterns are different between the initial transmission and the retransmissions according to a predetermined pattern. It can be appreciated that the msgA transmission pattern and the related resource configuration in FIG. 3A are just as examples, and there may be other possible msgA transmission patterns in which some of the resources can remain the same while others may be varied between different transmissions of msgA.

According to the exemplary msgA transmission pattern shown in FIG. 3A, the sequence of RVs has a period of 4 transmissions, i.e., RV3, RV2, RV0 and RV1 for transmissions T=0, T=1, T=2 and T=3. In order to combine a prior transmission of the PUSCH with the most recent, a gNB may need to know which RV is used and/or to know which transmission of the PUSCH is sent by a UE. Therefore, a preamble ID may be associated with each transmission, where in this embodiment ID1 is associated with a first transmission T=0 and RV3, preamble ID2 is associated with a second transmission T=1 and RV2, etc. If there are more than 4 transmissions, the RV sequence can restart with RV3, i.e., RV3, RV2, RV0 and RV1 for transmissions T=4, T=5, T=6 and T=7, as shown in FIG. 3A. According to some exemplary embodiments, a single RV can be used and thus may have a period of 1 transmission. In this case, different transmissions of msgA may be associated with the same RV.

The msgA transmission pattern with fewer parameter changes may be the simplest and intuitively most robust compared to other patterns. For example, the msgA transmission pattern as shown in FIG. 3A can provide on the order of 3 dB soft combining gain from the first retransmission, if channel conditions between the initial transmission and the first retransmission do not change. However, the flexibility of resource usage in this pattern may be limited in some deployment scenarios and collision probability with other msgA transmissions may exist. If more flexibility is desired and/or the full amount of incremental redundancy gain is not necessary, it may be considered to determine and vary the resources for different transmissions of msgA according to a known pattern. Optionally, the pattern may be pre-determined or configured by the network, e.g. via a system information block 1 (SIB1) message or other system information (SI) messages. Alternatively or additionally, the pattern can be signaled to a UE by the network via a UE-specific message.

In accordance with some exemplary embodiments, a pattern of retransmission resources (also called a msgA transmission pattern in various embodiments) can indicate how and where the subsequent transmissions may be performed. For example, the pattern may provide different resource allocations for various retransmissions, or the same resource for all retransmissions that differs from the initial transmission. In some embodiments, the different resource allocations may be a selection of different preamble IDs, PUSCH RUs, RVs and/or POs for different msgA transmissions.

In accordance with some exemplary embodiments, the resources (e.g., preamble IDs, PUSCH RUs, RVs, POs, etc.) allowed for the msgA retransmissions of a UE may be defined to be separate from the resources available for the initial msgA transmissions of other UEs. For example, the preambles allowed for the msgA retransmissions of the UE can be determined by selecting other preambles in the same preamble subset which are not selected for the initial msgA transmissions of other UEs, or by selecting preambles in other preamble subset, so as to reduce the probability of collision between the msgA transmissions of the UE and the other UEs.

In accordance with some exemplary embodiments, a msgA transmission pattern can be determined by defining several subsets of a msgA PUSCH set (such as the msgA PUSCH set shown in FIG. 2B) which are available for PO selection for different msgA transmissions. For example, some of the POs may be used for the initial msgA transmission, some for the first msgA retransmission, some for the second msgA retransmission, etc. Optionally, the msgA PUSCH subsets assigned for different transmission rounds may be disjoint or partially overlapping.

In accordance with some exemplary embodiments, identifiers or indices of preambles associated with the initial transmission and the retransmissions of msgA can be determined according to a sequence. For example, the sequence may be such that a preamble index of a msgA retransmission can be uniquely determined by a preamble index of a prior msgA transmission. In this way, if a preamble is determined to be associated with a msgA retransmission, the preambles of the prior msgA transmissions can be determined accordingly. Given the association of preambles to PUSCH resources (e.g., POs and/or PUSCH RUs), the PUSCH resources of the prior msgA transmissions can also be determined correspondingly.

In accordance with some exemplary embodiments, the sequence may be a list of length L, and each preamble index occurs once and only once in the list. In this way, knowledge of the prior msgA transmissions from a given preamble index can be uniquely determined. As an example, the list may be formed as a random permutation of the indices of the preambles, and the list can be specified such that both a gNB and a UE are aware of the list. In some embodiments, the list can be constructed using a B bit maximum length sequence generator according to $p_n = \sum_{i=0}^{B-1} 2^i \cdot x(n, i)$, where $p_n$ is the index of the preamble with the sequence index n, and x(n, i) is the ith bit in the maximum length sequence generator. In the case that there are fewer preambles than the length of the maximum length sequence, a value $p_n$ is larger than the number of preambles, this value may be excluded from the list, and subsequent values of $p_n$ are generated until an index that is less than the number of preambles is found.

In accordance with some exemplary embodiments where one-to-one or multiple-to-one mapping is applied between a preamble and a PUSCH RU, the preamble IDs selected for different msgA transmissions may be used to determine the corresponding PO for the initial and additional msgA PUSCH transmissions. According to some embodiments, at least $N_{PO}$ preambles are associated with a PO, where $N_{PO} \geq N_{TX}$, and $N_{TX}$ is the maximum number of allowed transmissions, including the initial transmission and retransmissions, that can be used for a PUSCH conveying a given instance of information bits. Different POs are associated with different sets of $N_{PO}$ preambles such that the PO and which transmission of the $N_{PO}$ transmissions have been sent can be determined from the preamble associated with the PO. As an example, a first transmission of the PUSCH in a PO may be associated with a first preamble of the $N_{PO}$ preambles associated with the PO. If a UE retransmits the PUSCH in the PO (e.g., with the same information bits) for the first time, the UE can transmit a second preamble of the $N_{PO}$ preambles associated with the PO. The same process may be used for a third transmission and subsequent transmissions of the PUSCH, if any. Referring again to FIG. 3A, it can be seen that $N_{PO}=4$ preambles with ID1 through ID4 correspond to transmissions T=0 through T=3, each of the 4 transmissions is in the same PO (i.e., PO1), and the UE can use this PO for the initial PUSCH transmission and its retransmissions.

FIG. 3B is a diagram illustrating another exemplary msgA transmission pattern according to some embodiments of the present disclosure. As shown in FIG. 3B, $N_{PO}=4$ preambles with ID1 through ID4 correspond to transmissions T=0 through T=3, but the POs available for the 4 transmissions are different. For instance, the POs labeled as POw, POx, POy and POz correspond to transmissions T=0, T=1, T=2 and T=3, respectively. Thus, a UE can perform retransmissions of a PUSCH in different POs. In this embodiment, any of the 4 transmissions can be in a PO and 4 preambles are associated with each PO. Correspondingly, the preambles associated with the same PO may be different from the case where retransmissions are in the same PO (as shown in FIG. 3A).

It will be realized that parameters, variables and settings related to the resource allocation and transmission configuration described herein are just examples. Other suitable pattern settings, the associated configuration parameters and the specific values thereof may also be applicable to implement the proposed methods.

In accordance with some exemplary embodiments, each msgA transmission may be performed using one or more different parameters, for example, including but not limited to a different redundancy version, amount of transmitted power, modulation state, and/or coding rate. In some embodiments, a specific mapping related to resource allocation in msgA retransmissions may be predefined. Alternatively or additionally, multiple mapping of resources may be defined and the actual mapping may be indicated by the network, e.g., in the SI or other suitable message.

In accordance with some exemplary embodiments, the msgA transmission pattern may depend on the resource (e.g., preamble ID, PO, RV, etc.) selected for the initial msgA transmission. As an example, a preamble ID and RV pattern may be provided for different msgA transmissions including the initial transmission and the retransmissions. In this pattern, preambles ID2, ID3 and ID4 associated with the second, third and fourth msgA transmissions may be a function of preamble ID1 associated with the first msgA transmission and can be derived, for example, according to the following equations:

$$ID2 = (ID1+1) \bmod N \quad (1)$$

$$ID3 = (ID1+2) \bmod N \quad (2)$$

$$ID4 = (ID1+3) \bmod N \quad (3)$$

where N is the total number of preambles supported for two-step RA (either contention based or contention free RA or both). According to some exemplary embodiments, the preamble ID (e.g., ID1) of the first transmission may be an integer multiple of the maximum number of retransmissions. In this case, $ID1 = N_{TX} \cdot y$, where $N_{TX}$ (e.g., $N_{TX}=4$) is the maximum number of allowed msgA transmissions and y<N/$N_{TX}$ is a random non-negative integer.

In accordance with some exemplary embodiments, some RV patterns can be predetermined or RRC configured for the msgA PUSCH retransmissions. The amount of incremental redundancy may be cell-specific, for example, indicated in SIB1, UE-specific, or signaled individually via RRC to UEs in known locations.

In accordance with some exemplary embodiments, the resources for the msgA retransmissions can be indicated by a gNB in a response message (e.g., a RAR message or msgB) to the msgA, and/or a physical layer (L1) signaling in downlink control information (DCI) for a UE. According to an exemplary embodiment, the gNB can estimate, for example, how much incremental redundancy is "missing" for successful decoding, which may be requested then accordingly via a downlink (DL) message or DCI for the UE. It may be noted that the RAR used for four-step RACH operation does not contain an indication of an RV to be used for msg3. However, it may be beneficial to indicate an RV in a response message to msgA in two-step RACH operation for a retransmission of the msgA PUSCH, so as to improve msgA performance and reduce latency. By using the response message to msgA to indicate resource configuration, the gNB can dynamically control the resources available/allocated for msgA retransmissions, and avoid a steady worst-case allocation. This can provide more flexibility for scheduling the retransmissions dynamically.

In accordance with some exemplary embodiments, the resource configuration of the msgA retransmissions may be related to whether hybrid automatic repeat request (HARQ) combing is supported. In the case that the HARQ combing is supported between the initial transmission and the retransmission of msgA, a set of resources (e.g., preambles) can be reserved for the retransmission of msgA, so that a gNB can detect whether the received transmission is the initial transmission or the retransmission of msgA. Optionally, if the HARQ combining is not expected to be supported, the retransmission of msgA can be treated as just a reattempt of a transmission of msgA.

Figure 4:
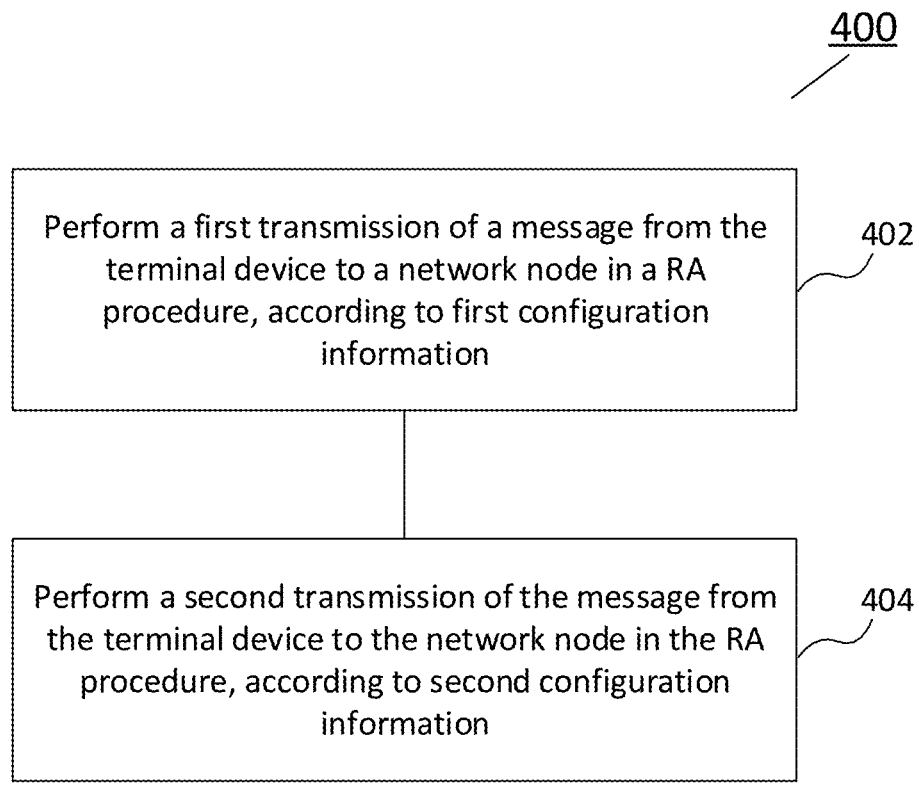
FIG. 4 is a flowchart illustrating a method according to some embodiments of the present disclosure.

FIG. 4 is a flowchart illustrating a method 400 according to some embodiments of the present disclosure. The method 400 illustrated in FIG. 4 may be performed by a terminal device or an apparatus communicatively coupled to the terminal device. In accordance with an exemplary embodiment, the terminal device such as a UE may be configurable to connect to a network node such as a gNB by performing a RA procedure (e.g., a two-step RA procedure).

According to the exemplary method 400 illustrated in FIG. 4, the terminal device can perform a first transmission of a message from the terminal device to a network node in a RA procedure, according to first configuration information, as shown in block 402. The first transmission of the message may comprise a transmission of a first preamble (e.g., a first PRACH preamble) and a transmission of a payload on a shared channel (e.g., a PUSCH). The first preamble may be associated with a first time-frequency location of the shared channel conveying an instance of information bits. In accordance with some exemplary embodiments, the message may be message A in a two-step RA procedure. It can be appreciated that the message may also be any suitable message in other types of RA procedure where the terminal device can access the network node according to the proposed solution.

In accordance with some exemplary embodiments, the terminal device may perform a second transmission of the message from the terminal device to the network node in the RA procedure, according to second configuration information, as shown in block 404. The second transmission of the message may comprise at least one of: a transmission of a second preamble (e.g., a second PRACH preamble) and a retransmission of the payload on the shared channel. The second preamble may be associated with a second time-frequency location of the shared channel. According to an exemplary embodiment, the first preamble and the second preamble may be the same or different. In an example, the second preamble may be randomly selected, or may be determined based at least in part on the first preamble according to a predefined or preconfigured rule. Optionally, the first time-frequency location and the second time-frequency location of the shared channel may be the same or different resource locations.

In accordance with some exemplary embodiments, the first configuration information and the second configuration information may indicate resources for the first transmission and the second transmission of the message, respectively. Optionally, the second configuration information may be the same as the first configuration information. In this case, the terminal device can perform the first and second transmissions of the message according to the same resource allocation and transmission configuration.

In accordance with some exemplary embodiments, the second configuration information may have one or more parameters associated with the first configuration information. Alternatively or additionally, the second configuration information may have one or more parameters different from the first configuration information. According to an exemplary embodiment, the one or more parameters may indicate, but not limited to, at least one of:
  a preamble ID;
  a RA channel time-frequency resource (e.g., a location in time domain and/or frequency domain available for a preamble or msgA PRACH);
  a shared channel time-frequency resource (e.g., a location in time domain and/or frequency domain available for a UL shared channel or msgA PUSCH);
  a DMRS ID (e.g., an index assigned to a PUSCH RU to identify at least one of a DMRS antenna port and a DMRS sequence initialization);
  a RV (or a RV pattern);
  a MCS (e.g., modulation state and/or coding rate); and
  transmission power (e.g., power ramping for msgA PRACH and/or msgA PUSCH).

In accordance with some exemplary embodiments, the first configuration information and the second configuration information can be determined according to a specific pattern (e.g., the msgA transmission pattern as described with respect to FIGS. 3A-3B). Optionally, the specific pattern may be provisioned or configured by the network node, or coordinated/predetermined by the network node and the terminal device. The specific pattern can indicate how to allocate resources (such as preambles, RVs, POs, etc.) to different transmissions of the message such as msgA. According to an exemplary embodiment, the specific pattern may be based at least in part on a predetermined RV pattern. As an example, the shared channel such as PUSCH in different transmissions may be constructed using different RV patterns. Alternatively or additionally, the first preamble and the second preamble can be determined according to a predetermined sequence (e.g., using a maximum length sequence generator).

In accordance with some exemplary embodiments, the second configuration information may be based at least in part on the first configuration information. Optionally, the second configuration information can be determined or derived from the first configuration information. As an example, at least one parameter (e.g., preamble ID, etc.) of the second configuration information can be determined according to the corresponding parameter (e.g., preamble ID, etc.) of the first configuration information, for example, according to any of equations (1)-(3).

In accordance with some exemplary embodiments, the second configuration information can enable the network node to combine different transmissions of the message. For example, in the case that HARQ combining is supported between different transmissions of the message, the RV pattern in the second configuration information can be configured or set to enable the network node to perform soft combining or chase combining for the received transmissions of the message.

In accordance with some exemplary embodiments, the first configuration information can enable the network node to determine that the first transmission of the message is an initial transmission of the message, and the second configuration information can enable the network node to determine that the second transmission of the message is a retransmission of the message. According to an exemplary embodiment, the resource indicated by the second configuration information may comprise some resource (e.g., one or more preambles/RVs/PUSCH RUs, etc.) reserved for a retransmission of the message. In this case, the network node can know whether the currently received transmission is an initial transmission or a retransmission, and thus can determine how to process the currently received transmission, for example, according to a predetermined signal processing rule and/or the capability of the network node.

In accordance with some exemplary embodiments, the resource indicated by the first configuration information and the corresponding resource indicated by the second configuration information may have a correlation satisfying a correlation criterion. According to an exemplary embodiment, the correlation criterion may specify that a correlation between the resource (e.g., preambles, POs, etc.) indicated by the first configuration information and the corresponding resource (e.g., preambles, POs, etc.) indicated by the second configuration information needs to be lower than a first correlation threshold. As an example, the resource used for the first transmission of the message may be selected from a subset of the msgA PUSCH set, and the resource used for the second transmission of the message may be selected from another subset of the msgA PUSCH set. The subsets available for resource selection of different transmissions of the message may be partially overlapping or even uncorrelated. In an exemplary embodiment, the resource indicated by the second configuration information may comprise resource randomly selected for a retransmission of the message. In this case, the first transmission and the second transmission of the message can be treated as two substantially unrelated transmissions.

Optionally, the resources indicated by the first and second configuration information for the terminal device and the corresponding resources indicated by configuration information for other terminal devices may have a correlation satisfying another correlation criterion (e.g., lower than a second correlation threshold). In this case, various msgA transmissions for different terminal devices may be assigned resources selected from different subsets of the msgA PUSCH set, or resources with lower correlation selected from the same subset of the msgA PUSCH set. The subsets of the msgA PUSCH set may be disjoint or less partially overlapping, so as to reduce the probability of collision between different msgA transmissions.

In accordance with some exemplary embodiments, the second configuration information may be indicated at least partly by a response message transmitted from the network node to the terminal device. In this case, the retransmission resources can be signaled by a response message to the previous transmission or to the initial transmission, and/or by L1 signaling in DCI scheduling additional retransmission. As an example, the network node can schedule the retransmission of msgA by a response message such as msgB. Thus, the network node can flexibly determine resource allocation for msgA retransmissions and dynamically scheduling UL transmissions of the terminal device.

Figure 5:
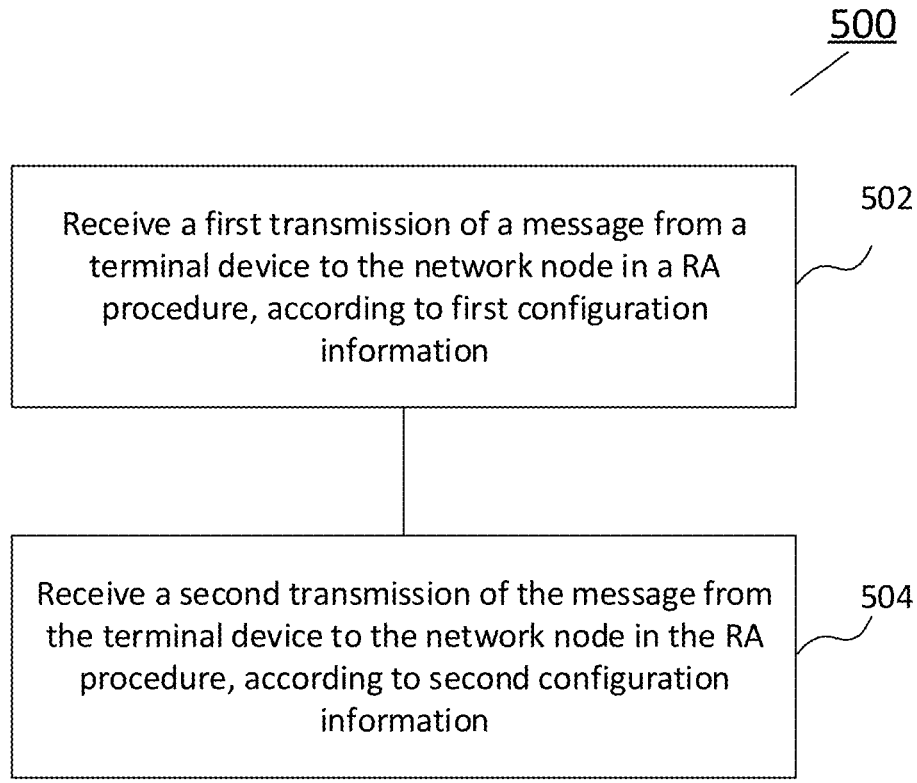
FIG. 5 is a flowchart illustrating another method according to some embodiments of the present disclosure.

FIG. 5 is a flowchart illustrating a method 500 according to some embodiments of the present disclosure. The method 500 illustrated in FIG. 5 may be performed by a network node or an apparatus communicatively coupled to the network node. In accordance with an exemplary embodiment, the network node may comprise a base station such as a gNB. The network node may be configurable to communicate with one or more terminal devices such as UEs which can connect to the network node by performing a RA procedure (e.g., a two-step RA procedure).

According to the exemplary method 500 illustrated in FIG. 5, the network node may receive a first transmission of a message from a terminal device (such as the terminal device described with respect to FIG. 4) to the network node in a RA procedure, according to first configuration information, as shown in block 502. In accordance with some exemplary embodiments, the network node may receive a second transmission of the message from the terminal device to the network node in the RA procedure, according to second configuration information, as shown in block 504. As described in connection with FIG. 4, the first transmission of the message may comprise a transmission of a first preamble (e.g., a first msgA PRACH or preamble) and a transmission of a payload on a shared channel (e.g., a msgA PUSCH), and the second transmission of the message may comprise at least one of: a transmission of a second preamble (e.g., a second msgA PRACH or preamble) and a retransmission of the payload on the shared channel. In accordance with some exemplary embodiments, there may be an association between the preamble resource (e.g., preamble ID and/or RO) and the shared channel resource (e.g., PUSCH and/or RU PO).

It can be appreciated that the steps, operations and configurations described with respect to the exemplary method 500 in FIG. 5 may be corresponding to the steps, operations and configurations described with respect to the exemplary method 400 in FIG. 4. In accordance with some exemplary embodiments, the network node may receive at least a part of the first transmission of the message successfully, and/or at least a part of the second transmission of the message successfully. The first configuration information and the second configuration information may respectively correspond to the first configuration information and the second configuration information as described with respect to FIG. 4. Optionally, the terminal device as described in connection with FIG. 4 may initiate one or more additional transmissions of the message according to specific configuration information. Correspondingly, the network node may receive one or more additional transmissions of the message from the terminal device.

The proposed solution according to one or more exemplary embodiments can enable a terminal device to perform a RA procedure (e.g., a two-step RA procedure) with a network node according to a specific msgA transmission pattern. In accordance with some exemplary embodiments, various resource and transmission parameters may be determined or configured for different transmissions including both initial transmission and retransmission(s) of msgA. Optionally, the resources determined for the initial msgA transmission and the msgA retransmission may be the same or different. The msgA transmission pattern according to various embodiments can be designed to support variable resource configuration and application of soft/chase combining, so as to improve flexibility of transmission configuration and performance of signaling processing, and enhance resource utilization.

The various blocks shown in FIGS. 4-5 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 6:
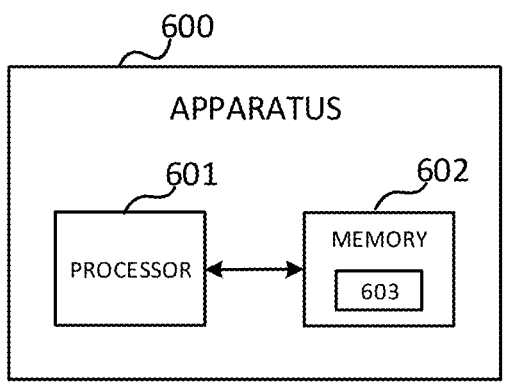
FIG. 6 is a block diagram illustrating an apparatus according to some embodiments of the present disclosure.

FIG. 6 is a block diagram illustrating an apparatus 600 according to various embodiments of the present disclosure. As shown in FIG. 6, the apparatus 600 may comprise one or more processors such as processor 601 and one or more memories such as memory 602 storing computer program codes 603. The memory 602 may be non-transitory machine/processor/computer readable storage medium. In accordance with some exemplary embodiments, the apparatus 600 may be implemented as an integrated circuit chip or module that can be plugged or installed into a terminal device as described with respect to FIG. 4, or a network node as described with respect to FIG. 5. In such case, the apparatus 600 may be implemented as a terminal device as described with respect to FIG. 4, or a network node as described with respect to FIG. 5.

In some implementations, the one or more memories 602 and the computer program codes 603 may be configured to, with the one or more processors 601, cause the apparatus 600 at least to perform any operation of the method as described in connection with FIG. 4. In other implementations, the one or more memories 602 and the computer program codes 603 may be configured to, with the one or more processors 601, cause the apparatus 600 at least to perform any operation of the method as described in connection with FIG. 5. Alternatively or additionally, the one or more memories 602 and the computer program codes 603 may be configured to, with the one or more processors 601, cause the apparatus 600 at least to perform more or less operations to implement the proposed methods according to the exemplary embodiments of the present disclosure.

Various embodiments of the present disclosure provide an apparatus for random access. The apparatus may comprise a first transmitting unit and a second transmitting unit. In an exemplary embodiment, the apparatus may be implemented in a terminal device such as a UE. The first transmitting unit may be operable to carry out the operation in block 402, and the second transmitting unit may be operable to carry out the operation in block 404. In some implementations, the first transmitting unit and the second transmitting unit may be implemented as a single transmitting unit. Optionally, the first transmitting unit and/or the second transmitting unit may be operable to carry out more or less operations to implement the proposed methods according to the exemplary embodiments of the present disclosure.

Various embodiments of the present disclosure provide an apparatus for random access. The apparatus may comprise a first receiving unit and a second receiving unit. In an exemplary embodiment, the apparatus may be implemented in a network node such as a base station. The first receiving unit may be operable to carry out the operation in block 502, and the second receiving unit may be operable to carry out the operation in block 504. In some implementations, the first receiving unit and the second receiving unit may be implemented as a single receiving unit. Optionally, the first receiving unit and/or the second receiving unit may be operable to carry out more or less operations to implement the proposed methods according to the exemplary embodiments of the present disclosure.

Figure 7:
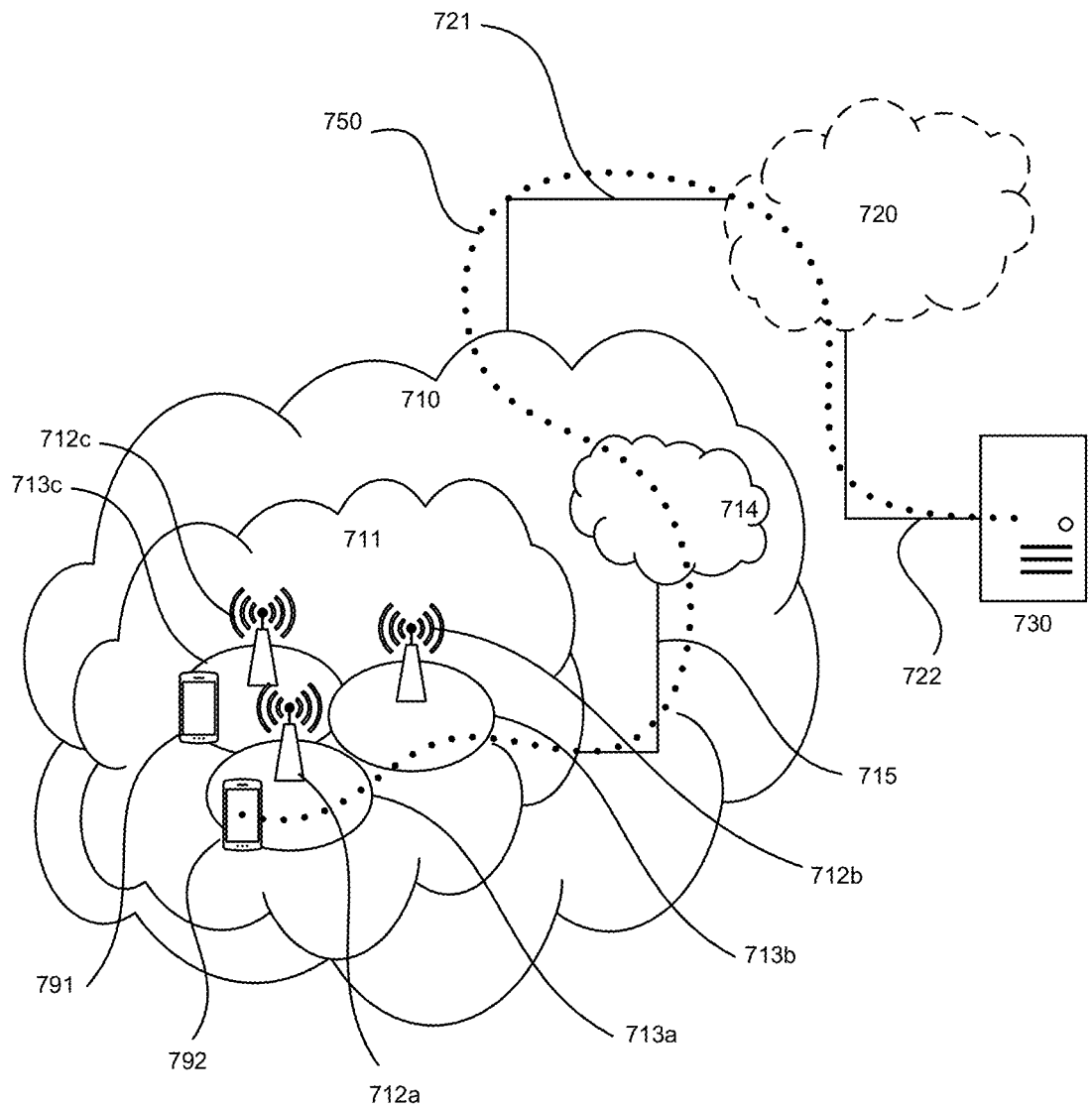
FIG. 7 is a block diagram illustrating a telecommunication network connected via an intermediate network to a host computer in accordance with some embodiments of the present disclosure.

FIG. 7 is a block diagram illustrating a telecommunication network connected via an intermediate network to a host computer in accordance with some embodiments of the present disclosure.

With reference to FIG. 7, in accordance with an embodiment, a communication system includes a telecommunication network 710, such as a 3GPP-type cellular network, which comprises an access network 711, such as a radio access network, and a core network 714. The access network 711 comprises a plurality of base stations 712a, 712b, 712c, such as NBs, eNBs, gNBs or other types of wireless access points, each defining a corresponding coverage area 713a, 713b, 713c. Each base station 712a, 712b, 712c is connectable to the core network 714 over a wired or wireless connection 715. A first UE 791 located in a coverage area 713c is configured to wirelessly connect to, or be paged by, the corresponding base station 712c. A second UE 792 in a coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712.

The telecommunication network 710 is itself connected to a host computer 730, which may be embodied in the hardware and/or software of a standalone server, a cloud-implemented server, a distributed server or as processing resources in a server farm. The host computer 730 may be under the ownership or control of a service provider, or may be operated by the service provider or on behalf of the service provider. Connections 721 and 722 between the telecommunication network 710 and the host computer 730 may extend directly from the core network 714 to the host computer 730 or may go via an optional intermediate network 720. An intermediate network 720 may be one of, or a combination of more than one of, a public, private or hosted network; the intermediate network 720, if any, may be a backbone network or the Internet; in particular, the intermediate network 720 may comprise two or more sub-networks (not shown).

The communication system of FIG. 7 as a whole enables connectivity between the connected UEs 791, 792 and the host computer 730. The connectivity may be described as an over-the-top (OTT) connection 750. The host computer 730 and the connected UEs 791, 792 are configured to communicate data and/or signaling via the OTT connection 750, using the access network 711, the core network 714, any intermediate network 720 and possible further infrastructure (not shown) as intermediaries. The OTT connection 750 may be transparent in the sense that the participating communication devices through which the OTT connection 750 passes are unaware of routing of uplink and downlink communications. For example, the base station 712 may not or need not be informed about the past routing of an incoming downlink communication with data originating from the host computer 730 to be forwarded (e.g., handed over) to a connected UE 791. Similarly, the base station 712 need not be aware of the future routing of an outgoing uplink communication originating from the UE 791 towards the host computer 730.

Figure 8:
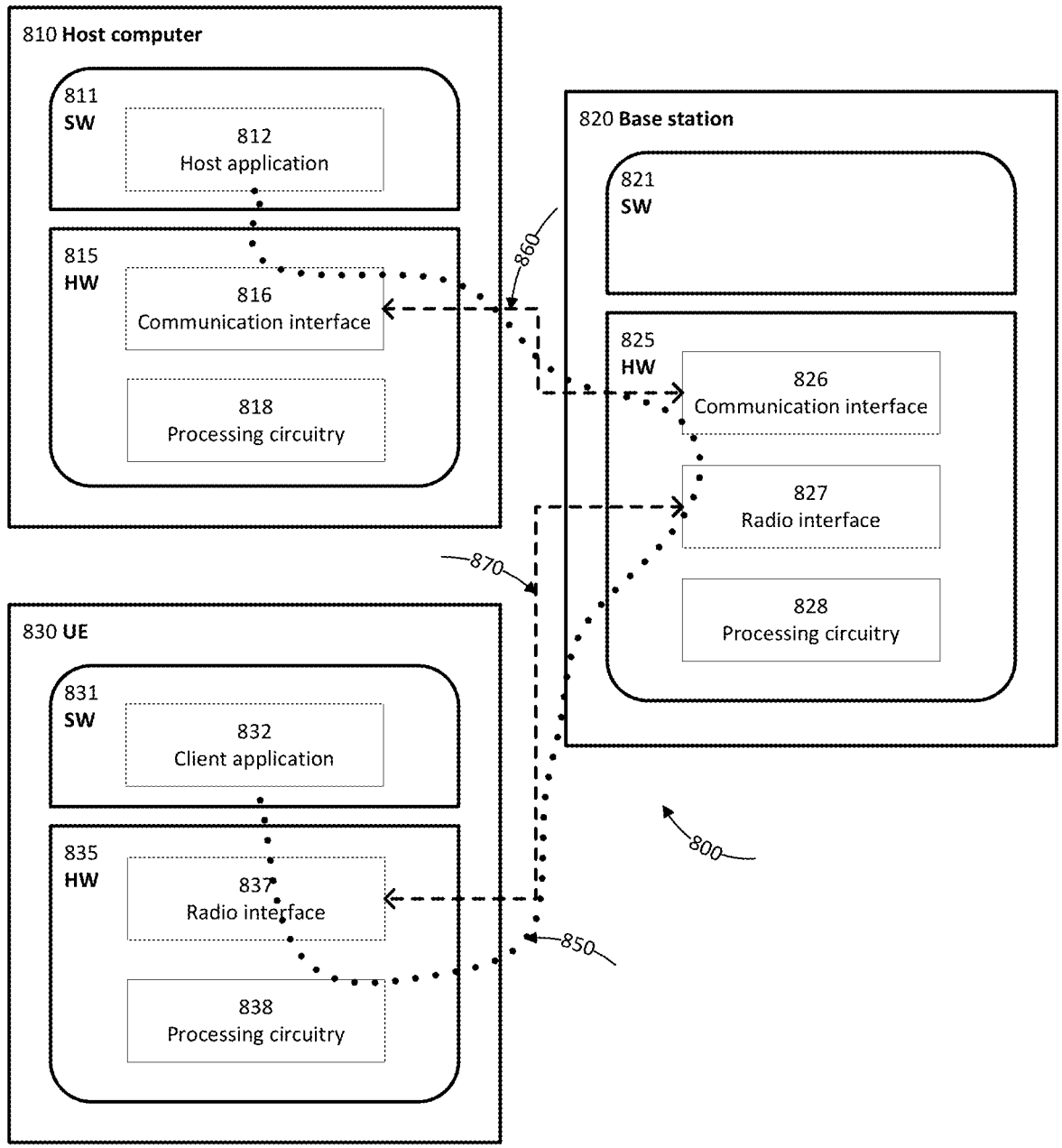
FIG. 8 is a block diagram illustrating a host computer communicating via a base station with a UE over a partially wireless connection in accordance with some embodiments of the present disclosure.

FIG. 8 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 8. In a communication system 800, a host computer 810 comprises hardware 815 including a communication interface 816 configured to set up and maintain a wired or wireless connection with an interface of a different communication device of the communication system 800. The host computer 810 further comprises a processing circuitry 818, which may have storage and/or processing capabilities. In particular, the processing circuitry 818 may comprise one or more programmable processors, application-specific integrated circuits, field programmable gate arrays or combinations of these (not shown) adapted to execute instructions. The host computer 810 further comprises software 811, which is stored in or accessible by the host computer 810 and executable by the processing circuitry 818. The software 811 includes a host application 812. The host application 812 may be operable to provide a service to a remote user, such as UE 830 connecting via an OTT connection 850 terminating at the UE 830 and the host computer 810. In providing the service to the remote user, the host application 812 may provide user data which is transmitted using the OTT connection 850.

The communication system 800 further includes a base station 820 provided in a telecommunication system and comprising hardware 825 enabling it to communicate with the host computer 810 and with the UE 830. The hardware 825 may include a communication interface 826 for setting up and maintaining a wired or wireless connection with an interface of a different communication device of the communication system 800, as well as a radio interface 827 for setting up and maintaining at least a wireless connection 870 with the UE 830 located in a coverage area (not shown in FIG. 8) served by the base station 820. The communication interface 826 may be configured to facilitate a connection 860 to the host computer 810. The connection 860 may be direct or it may pass through a core network (not shown in FIG. 8) of the telecommunication system and/or through one or more intermediate networks outside the telecommunication system. In the embodiment shown, the hardware 825 of the base station 820 further includes a processing circuitry 828, which may comprise one or more programmable processors, application-specific integrated circuits, field programmable gate arrays or combinations of these (not shown) adapted to execute instructions. The base station 820 further has software 821 stored internally or accessible via an external connection.

The communication system 800 further includes the UE 830 already referred to. Its hardware 835 may include a radio interface 837 configured to set up and maintain a wireless connection 870 with a base station serving a coverage area in which the UE 830 is currently located. The hardware 835 of the UE 830 further includes a processing circuitry 838, which may comprise one or more programmable processors, application-specific integrated circuits, field programmable gate arrays or combinations of these (not shown) adapted to execute instructions. The UE 830 further comprises software 831, which is stored in or accessible by the UE 830 and executable by the processing circuitry 838. The software 831 includes a client application 832. The client application 832 may be operable to provide a service to a human or non-human user via the UE 830, with the support of the host computer 810. In the host computer 810, an executing host application 812 may communicate with the executing client application 832 via the OTT connection 850 terminating at the UE 830 and the host computer 810. In providing the service to the user, the client application 832 may receive request data from the host application 812 and provide user data in response to the request data. The OTT connection 850 may transfer both the request data and the user data. The client application 832 may interact with the user to generate the user data that it provides.

It is noted that the host computer 810, the base station 820 and the UE 830 illustrated in FIG. 8 may be similar or identical to the host computer 730, one of base stations 712*a*, 712*b*, 712*c* and one of UEs 791, 792 of FIG. 7, respectively. This is to say, the inner workings of these entities may be as shown in FIG. 8 and independently, the surrounding network topology may be that of FIG. 7.

In FIG. 8, the OTT connection 850 has been drawn abstractly to illustrate the communication between the host computer 810 and the UE 830 via the base station 820, without explicit reference to any intermediary devices and the precise routing of messages via these devices. Network infrastructure may determine the routing, which it may be configured to hide from the UE 830 or from the service provider operating the host computer 810, or both. While the OTT connection 850 is active, the network infrastructure may further take decisions by which it dynamically changes the routing (e.g., on the basis of load balancing consideration or reconfiguration of the network).

Wireless connection 870 between the UE 830 and the base station 820 is in accordance with the teachings of the embodiments described throughout this disclosure. One or more of the various embodiments improve the performance of OTT services provided to the UE 830 using the OTT connection 850, in which the wireless connection 870 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 850 between the host computer 810 and the UE 830, in response to variations in the measurement results. The measurement procedure and/or the network functionality for reconfiguring the OTT connection 850 may be implemented in software 811 and hardware 815 of the host computer 810 or in software 831 and hardware 835 of the UE 830, or both. In embodiments, sensors (not shown) may be deployed in or in association with communication devices through which the OTT connection 850 passes; the sensors may participate in the measurement procedure by supplying values of the monitored quantities exemplified above, or supplying values of other physical quantities from which the software 811, 831 may compute or estimate the monitored quantities. The reconfiguring of the OTT connection 850 may include message format, retransmission settings, preferred routing etc.; the reconfiguring need not affect the base station 820, and it may be unknown or imperceptible to the base station 820. Such procedures and functionalities may be known and practiced in the art. In certain embodiments, measurements may involve proprietary UE signaling facilitating the host computer 810's measurements of throughput, propagation times, latency and the like. The measurements may be implemented in that the software 811 and 831 causes messages to be transmitted, in particular empty or 'dummy' messages, using the OTT connection 850 while it monitors propagation times, errors etc.

Figure 9:
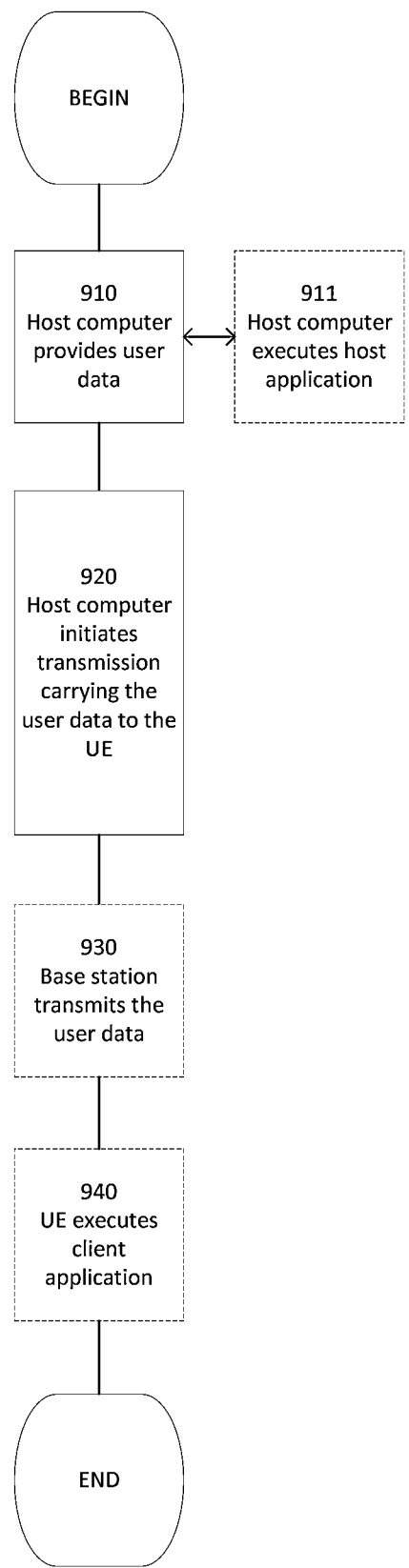
FIG. 9 is a flowchart illustrating a method implemented in a communication system, in accordance with an embodiment of the present disclosure.

FIG. 9 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 9 will be included in this section. In step 910, the host computer provides user data. In substep 911 (which may be optional) of step 910, the host computer provides the user data by executing a host application. In step 920, the host computer initiates a transmission carrying the user data to the UE. In step 930 (which may be optional), the base station transmits to the UE the user data which was carried in the transmission that the host computer initiated, in accordance with the teachings of the embodiments described throughout this disclosure. In step 940 (which may also be optional), the UE executes a client application associated with the host application executed by the host computer.

Figure 10:
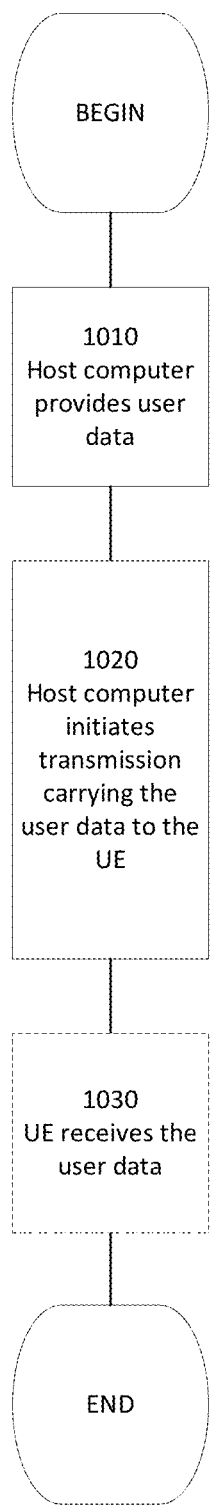
FIG. 10 is a flowchart illustrating a method implemented in a communication system, in accordance with an embodiment of the present disclosure.

FIG. 10 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 10 will be included in this section. In step 1010 of the method, the host computer provides user data. In an optional substep (not shown) the host computer provides the user data by executing a host application. In step 1020, the host computer initiates a transmission carrying the user data to the UE. The transmission may pass via the base station, in accordance with the teachings of the embodiments described throughout this disclosure. In step 1030 (which may be optional), the UE receives the user data carried in the transmission.

Figure 11:
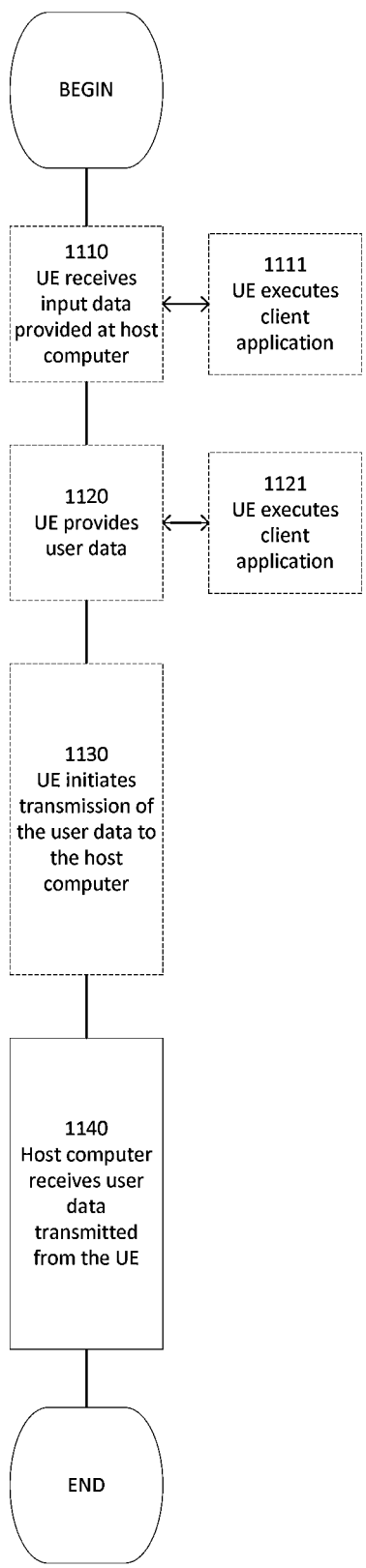
FIG. 11 is a flowchart illustrating a method implemented in a communication system, in accordance with an embodiment of the present disclosure.

FIG. 11 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 11 will be included in this section. In step 1110 (which may be optional), the UE receives input data provided by the host computer. Additionally or alternatively, in step 1120, the UE provides user data. In substep 1121 (which may be optional) of step 1120, the UE provides the user data by executing a client application. In substep 1111 (which may be optional) of step 1110, the UE executes a client application which provides the user data in reaction to the received input data provided by the host computer. In providing the user data, the executed client application may further consider user input received from the user. Regardless of the specific manner in which the user data was provided, the UE initiates, in substep 1130 (which may be optional), transmission of the user data to the host computer. In step 1140 of the method, the host computer receives the user data transmitted from the UE, in accordance with the teachings of the embodiments described throughout this disclosure.

Figure 12:
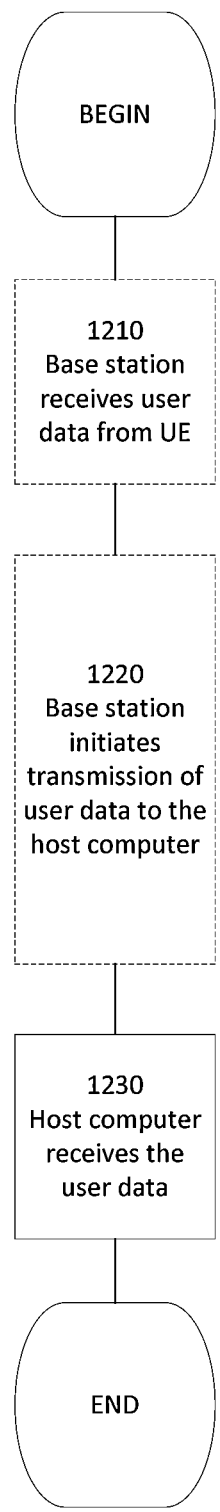
FIG. 12 is a flowchart illustrating a method implemented in a communication system, in accordance with an embodiment of the present disclosure.

FIG. 12 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 12 will be included in this section. In step 1210 (which may be optional), in accordance with the teachings of the embodiments described throughout this disclosure, the base station receives user data from the UE. In step 1220 (which may be optional), the base station initiates transmission of the received user data to the host computer. In step 1230 (which may be optional), the host computer receives the user data carried in the transmission initiated by the base station.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method performed by a terminal device, comprising:
performing a first transmission of a message from the terminal device to a network node in a random access procedure, according to first configuration information, wherein the first transmission of the message comprises a transmission of a first preamble and a transmission of a payload on a shared channel; and
performing a second transmission of the message from the terminal device to the network node in the random access procedure, according to second configuration information, wherein the second transmission of the message comprises at least one of:

a transmission of a second preamble and a retransmission of the payload on the shared channel;

where the first configuration information and the second configuration information indicate resources for the first transmission and the second transmission of the message, respectively; and where the resource indicated by the first configuration information and the corresponding resource indicated by the second configuration information have a correlation satisfying a correlation criterion.

2. The method according to claim 1, wherein the second configuration information has one or more parameters different from the first configuration information.

3. The method according to claim 2, wherein the one or more parameters indicates at least one of:
a preamble identifier;
a random access channel time-frequency resource;
a shared channel time-frequency resource;
a demodulation reference signal identifier;
a redundancy version;
a modulation and coding scheme; and
transmission power.

4. The method according to claim 1, wherein the first configuration information and the second configuration information is determined according to a specific pattern.

5. The method according to claim 4, wherein the specific pattern is based at least in part on a predetermined redundancy version pattern.

6. The method according to claim 4, wherein the specific pattern is provisioned by the network node.

7. The method according to claim 1, wherein the second configuration information is based at least in part on the first configuration information.

8. The method according to claim 1, wherein the second configuration information enables the network node to combine different transmissions of the message.

9. The method according to claim 1, wherein the first configuration information enables the network node to determine that the first transmission of the message is an initial transmission of the message, and wherein the second configuration information enables the network node to determine that the second transmission of the message is a retransmission of the message.

10. The method according to claim 1, wherein the first preamble and the second preamble are determined according to a predetermined sequence.

11. The method according to claim 1, wherein the second configuration information is indicated at least partly by a response message transmitted from the network node to the terminal device.

12. The method according to claim 1, wherein the resource indicated by the second configuration information comprises resource reserved for a retransmission of the message.

13. The method according to claim 1, wherein the resource indicated by the second configuration information comprises resource randomly selected for a retransmission of the message.

14. The method according to claim 1, wherein the message is message A in a two-step random access procedure.

15. The method according to claim 1, wherein the first preamble is a first physical random access channel preamble and the second preamble is a second physical random access channel preamble.

16. The method according to claim 1, wherein the shared channel is a physical uplink shared channel.

17. A method performed by a network node, comprising:
receiving a first transmission of a message from a terminal device to the network node in a random access procedure, according to first configuration information, wherein the first transmission of the message comprises a transmission of a first preamble and a transmission of a payload on a shared channel; and receiving a second transmission of the message from the terminal device to the network node in the random access procedure, according to second configuration information, wherein the second transmission of the message comprises at least one of:
a transmission of a second preamble and a retransmission of the payload on the shared channel;

where the first configuration information and the second configuration information indicate resources for the first transmission and the second transmission of the message, respectively; and where the resource indicated by the first configuration information and the corresponding resource indicated by the second configuration information have a correlation satisfying a correlation criterion.

18. A terminal device, comprising:
one or more processors; and
one or more memories comprising computer program codes, the one or more memories and the computer program codes configured to, with the one or more processors, cause the terminal device at least to:
perform a first transmission of a message from the terminal device to a network node in a random access procedure, according to first configuration information, wherein the first transmission of the message comprises a transmission of a first preamble and a transmission of a payload on a shared channel; and perform a second transmission of the message from the terminal device to the network node in the random access procedure, according to second configuration information, wherein the second transmission of the message comprises at least one of:
a transmission of a second preamble and a retransmission of the payload on the shared channel;

where the first configuration information and the second configuration information indicate resources for the first transmission and the second transmission of the message, respectively; and where the resource indicated by the first configuration information and the corresponding resource indicated by the second configuration information have a correlation satisfying a correlation criterion.

* * * * *